United States Patent
Han et al.

(10) Patent No.: US 9,870,008 B2
(45) Date of Patent: Jan. 16, 2018

(54) SYSTEMS AND METHODS FOR LIMITING DC VOLTAGE

(71) Applicant: Emerson Electric Co., St. Louis, MO (US)

(72) Inventors: Li Han, Xi'an (CN); Liang Cao, Xi'an (CN); Lihui Tu, Xi'an (CN); Bradley C. Zikes, Sunset Hills, MO (US)

(73) Assignee: Emerson Electric Co., St. Louis, MO (US)

( * ) Notice: Subject to any disclaimer, the term of this patent is extended or adjusted under 35 U.S.C. 154(b) by 504 days.

(21) Appl. No.: 14/661,116

(22) Filed: Mar. 18, 2015

(65) Prior Publication Data

US 2016/0259350 A1    Sep. 8, 2016

(30) Foreign Application Priority Data

Mar. 4, 2015   (CN) .......................... 2015 1 0097301
Mar. 4, 2015   (CN) ..................... 2015 2 0126797 U

(51) Int. Cl.
  *G05D 23/19*    (2006.01)
  *H02M 3/158*    (2006.01)
  *H02H 3/20*     (2006.01)
  *H02H 9/04*     (2006.01)

(52) U.S. Cl.
  CPC ............. *G05D 23/19* (2013.01); *H02H 3/202* (2013.01); *H02H 9/04* (2013.01)

(58) Field of Classification Search
  CPC .... G05D 23/19; G05D 23/1917; H02H 3/202; H02H 9/04; H02M 3/158
  USPC .......................................................... 361/18
  See application file for complete search history.

(56) References Cited

U.S. PATENT DOCUMENTS

| | | | |
|---|---|---|---|
| 4,898,229 A | 2/1990 | Brown et al. | |
| 5,057,714 A * | 10/1991 | Hatano | H03K 19/09429 326/110 |
| 5,127,464 A | 7/1992 | Butler et al. | |
| 5,352,930 A | 10/1994 | Ratz | |
| 7,397,369 B2 | 7/2008 | Zajac et al. | |
| 7,402,780 B2 | 7/2008 | Mueller et al. | |
| 7,696,870 B2 | 4/2010 | Zajac et al. | |
| 8,421,621 B2 | 4/2013 | Zajac et al. | |
| 2008/0013343 A1 * | 1/2008 | Matthews | H02M 7/062 363/16 |

(Continued)

OTHER PUBLICATIONS

*FTC Sensors, LLC* v. *Emerson Electric Co.* Complaint, Eastern District of Texas, Case 2:15-cv-02012 filed Nov. 30, 2015; 11 pages.

*Primary Examiner* — Thienvu Tran
*Assistant Examiner* — Kevin J Comber
(74) *Attorney, Agent, or Firm* — Harness, Dickey & Pierce, P.L.C.

(57) ABSTRACT

Disclosed are exemplary embodiments of systems and methods for limiting DC voltage. In an exemplary embodiment, a DC voltage limiting circuit generally includes a current supply portion configured to receive a voltage input signal and provide a voltage output signal. A protective portion of the circuit is configured to limit or halt, at least temporarily, operation of the current supply portion based on a magnitude of the voltage input signal. A voltage level control portion is configured to limit the voltage output signal to a predetermined voltage level. In some embodiments, the DC voltage limiting circuit is provided in a climate control system controller.

20 Claims, 3 Drawing Sheets

(56) References Cited

U.S. PATENT DOCUMENTS

2012/0126021 A1 5/2012 Warren et al.
2013/0103204 A1* 4/2013 Stefanski ........... G05D 23/1902
  700/276

* cited by examiner

SYSTEMS AND METHODS FOR LIMITING DC VOLTAGE

CROSS-REFERENCE TO RELATED APPLICATIONS

This application claims the benefit and priority of Chinese Patent of Invention Application No. 201510097301.5 filed Mar. 4, 2015, and Chinese Utility Model Application No. 201520126797.X filed Mar. 4, 2015. The entire disclosures of the above applications are incorporated herein by reference.

FIELD

The present disclosure generally relates to systems and methods for limiting DC voltage.

BACKGROUND

This section provides background information related to the present disclosure which is not necessarily prior art.

Digital thermostats and other climate control system controllers typically have microcomputers and other components that continuously use electrical power. Various thermostats may utilize power stealing to obtain operating power. Thus, for example, when a load (e.g., a compressor, fan, or gas valve) in a climate control system has been switched off, operating power for the thermostat may be stolen from the circuit for that load.

SUMMARY

This section provides a general summary of the disclosure, and is not a comprehensive disclosure of its full scope or all of its features.

According to various aspects, exemplary embodiments are disclosed of systems and methods for limiting DC voltage. In an exemplary embodiment, a DC voltage limiting circuit generally includes a current supply portion configured to receive a voltage input signal and provide a voltage output signal. A protective portion of the circuit is configured to limit or halt, at least temporarily, operation of the current supply portion based on a magnitude of the voltage input signal. A voltage level control portion is configured to limit the voltage output signal to a predetermined voltage level. In some embodiments, the DC voltage limiting circuit is provided in a climate control system controller.

In another example embodiment, a DC voltage limiting circuit includes first and second transistors configured to receive a voltage input signal, each having an emitter configured to provide current through a switch to provide an output voltage signal. The second transistor has a base in series with a first Zener diode reverse-biased in relation to the voltage input signal. A second Zener diode has a Zener voltage higher than the Zener voltage of the first Zener diode. The second Zener diode is connected between a gate of the switch and a source of the switch and reverse-biased in relation to the gate. A third transistor has a base connected with the voltage output through a third Zener diode reverse-biased in relation to the voltage output and having a Zener voltage corresponding to a predetermined voltage level.

Also disclosed are methods that generally include a method of limiting DC voltage. In response to a voltage input signal, current is supplied to provide a voltage output signal, the supplying performed by a current supply portion of a DC voltage limiting circuit of a climate control system controller. The example method includes limiting operation of the current supply portion based on a magnitude of the voltage input signal, the limiting performed by a protective portion of the DC voltage limiting circuit. The example method also includes limiting the voltage output signal to a predetermined voltage maximum level.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The inventors hereof have recognized that most climate control system thermostats use 24 to 30 VAC input voltages as a power input, typically using an AC/DC converter to obtain DC voltages. A linear or buck circuit may then be used to lower the voltage for energy storage and to provide power to the thermostat system. It is possible, however, for a customer to have mistakenly connected thermostat wiring to a 24-volt transformer. In such cases, the AC input to the thermostat may be, e.g., 48 to 60 volts. If the thermostat is used after having been wired incorrectly, overheating and/or over-voltage problems can occur. Accordingly, the inventors have developed and disclose herein exemplary embodiments of a DC voltage limiting circuit that generally includes a current supply portion configured to receive a voltage input signal and provide a voltage output signal. A protective portion of the circuit is configured to limit or halt, at least temporarily, operation of the current supply portion based on a magnitude of the voltage input signal. A voltage level control portion is configured to limit the voltage output signal to a predetermined voltage level.

Figure 1:
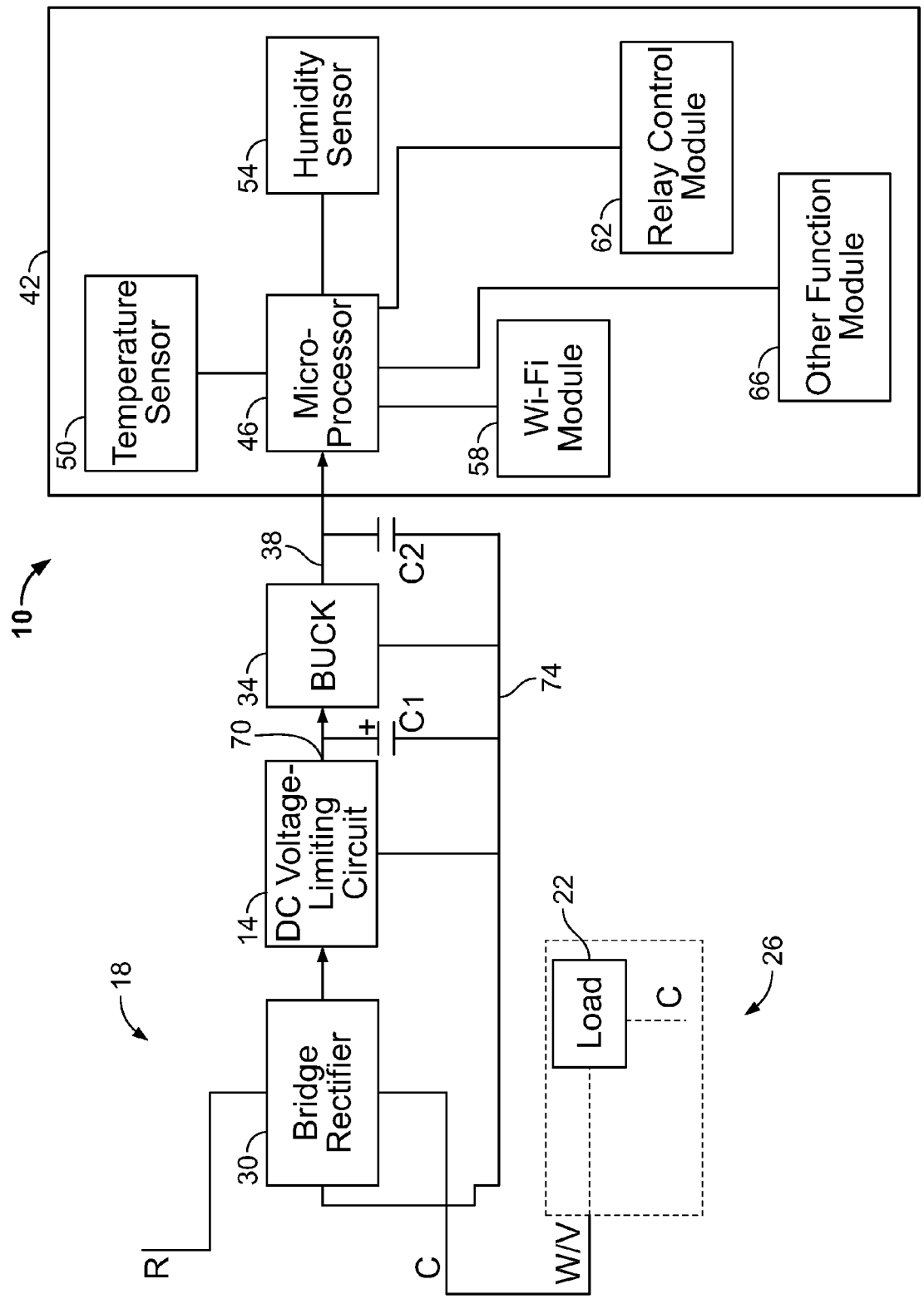
FIG. 1 is a diagram of a thermostat including a DC voltage-limiting circuit in accordance with one example embodiment of the present disclosure.

With reference now to the figures, FIG. 1 illustrates an exemplary embodiment of a climate control system controller, e.g., a thermostat 10, that includes a DC voltage-limiting circuit 14 embodying one or more aspects of the present disclosure. As shown in FIG. 1, power stealing circuitry 18 of the thermostat 10 obtains power, e.g., through one or more loads 22 of a climate control system 26 in which the thermostat 10 is included. For example, as shown in FIG. 1, a bridge rectifier 30 of the power stealing circuitry 18 receives power, e.g., at between 18 VAC and 30 VAC, through a heating or cooling load 22 that is deactivated. The deactivated load 22 may be e.g., a gas valve or compressor that is switched off. The power stealing circuitry 18 obtains power through the load 22 from, e.g., a transformer (not shown) that powers the load 22 when the load 22 is switched on.

It should be noted that the power stealing circuitry 18 is only exemplary. In various embodiments of the disclosure, power stealing may be performed in various ways, for various amounts of power, and from various power sources. It should be noted further that DC voltage-limiting circuits could be implemented in accordance with aspects of the present disclosure in relation to other or additional electronic devices and/or controllers besides thermostats. Still further, although various voltages and other values are provided in various example embodiments described herein, such values are examples only and are provided to facilitate understanding of the various embodiments.

Referring again to FIG. 1, the bridge rectifier 30 may provide a wide range of DC output voltage, e.g., from about 25V to about 42V, to the DC voltage-limiting circuit 14. The DC voltage-limiting circuit 14 charges a power supply capacitor C1, e.g., to about 30 VDC. A voltage step-down converter, e.g., a buck circuit 34, is electrically connected with the DC voltage-limiting circuit 14 and across the capacitor C1. The buck circuit 34 provides a voltage output 38 of, e.g., 3.3 VDC to various thermostat circuits 42, including, without limitation, one or more of the following: a microprocessor 46, temperature and humidity sensors 50 and 54, a Wi-Fi module 58, a relay control module 62, and/or other thermostat function module(s) 66. The capacitor C1 is connected between a voltage output 70 of the DC voltage-limiting circuit 14 and power ground 74. In the present example embodiment, the DC voltage-limiting circuit 14 is used for limiting the input voltage to the capacitor C1. Another capacitor C2 is provided between the buck circuit voltage output 38 and power ground 74.

Figure 2:
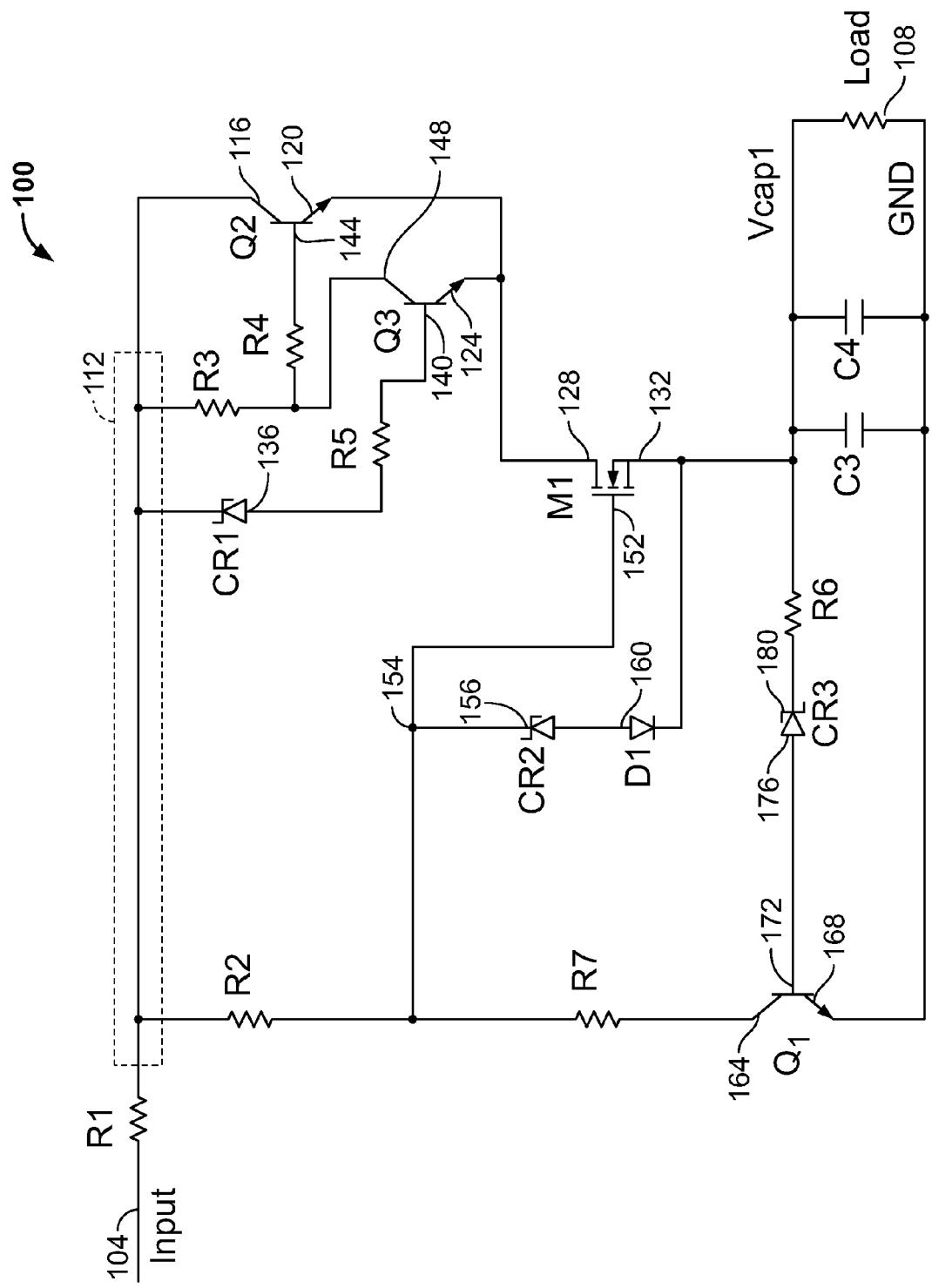
FIG. 2 is a diagram of a DC voltage-limiting circuit in accordance with one example embodiment of the present disclosure.

One example embodiment of a DC voltage-limiting circuit is indicated generally in FIG. 2 by reference number 100. The DC voltage-limiting circuit 100 receives at a voltage input 104 a voltage input signal, e.g., rectified AC voltage from a rectifier circuit included in power stealing circuitry of a thermostat (not shown in FIG. 2). The DC voltage-limiting circuit 100 provides an output voltage Vcap1, e.g., for powering a thermostat load 108 using two capacitors C3 and C4. The capacitors C3 and C4 are connected in parallel between the output voltage Vcap1 and ground GND. It should be noted that although the two capacitors C3 and C4 are provided in the present example embodiment, in other embodiments a single capacitor or more than two capacitors could be provided.

The voltage Vcap1 varies with the load 108 and with the amounts of charge on the capacitors C3 and C4. In the present embodiment, the DC voltage-limiting circuit 100 limits the voltage Vcap1 to 30 VDC, and the load 108 is a buck circuit (not shown in FIG. 2). It should be noted, however, that various DC voltage-limiting circuit embodiments in accordance with aspects of the disclosure could be used to limit voltage to other voltage values and/or to provide voltage output for use in other or additional types of circuitry.

In the present example embodiment, the voltage input 104 typically is between 24 and 30 volts during thermostat operation. The voltage input 104 could be unusually high, however, e.g., between 48 and 60 VAC, when a user has misconnected a wire on a climate control system 24-volt transformer to the thermostat that includes the DC voltage-limiting circuit 100. In the present example embodiment, the DC voltage-limiting circuit 100 is configured to protect power stealing circuitry and the thermostat in the event that the input voltage reaches a level that otherwise might cause overheating and/or over-voltage conditions.

Referring again to FIG. 2, a small resistance R1 is provided between the voltage input 104 and the rest of the DC voltage-limiting circuit 100. The resistance R1 is connected at a node 112 with a resistor R2, a first Zener diode CR1, a resistor R3, and the collector 116 of an NPN transistor Q2. The emitter 120 of the transistor Q2 is connected with the emitter 124 of an NPN transistor Q3. Both emitters 120 and 124 are connected with the drain 128 of a MOSFET M1. Current leaving the source 132 of the MOSFET M1 is at the output voltage Vcap1.

The anode 136 of the Zener diode CR1 is connected, through a resistor R5, with the base 140 of the transistor Q3. The base 144 of the transistor Q2 is connected, through a resistor R4, between the resistor R3 and the collector 148 of the transistor Q3. The gate 152 of the MOSFET M1 is connected between the resistor R2 and a resistor R7. The gate 152 is also connected at a node 154 with the source 132 of the MOSFET M1, through a second Zener diode CR2 in series with a diode D1. The cathode 156 of the Zener diode CR2 and the anode 160 of the diode D1 are directed toward the node 154.

The collector 164 of an NPN transistor Q1 is connected with the voltage input 104 through resistors R1, R2 and R7. Current leaving the emitter 168 of the transistor Q1 goes to ground GND. A third Zener diode CR3 and a resistor R6 are connected in series with the base 172 of the transistor Q1 and receive current output from the MOSFET source 132 at the output voltage Vcap1. The anode 176 and cathode 180 of the Zener diode CR3 are directed respectively toward the transistor Q1 and the resistor R6. In the present example embodiment, the Zener diodes CR1, CR2, and CR3 each have different Zener voltages, where the Zener voltage of CR1 is the lowest and the Zener voltage of CR3 is the highest of the three Zener voltages.

In operation, transistors Q2 and Q3 supply current to the DC voltage-limiting circuit 100. The MOSFET M1 performs as a switch to forward and cut the current received from transistors Q2 and Q3. The transistor Q1 and Zener diode CR3 serve as a switch controller and to limit the level of output voltage Vcap1 to the Zener voltage of the Zener diode CR3. The Zener diode CR2 and diode D1 serve to protect the DC voltage-limiting circuit 100 against unusually high input voltages.

For example, when the signal at voltage input 104 has a lower voltage than the Zener voltage of the Zener diode CR1, current flows through the emitter 120 of the transistor Q2 to the MOSFET M1. Current also flows through the gate 152 of the MOSFET M1, which is switched and kept ON by positive gate-source voltage. Current flows through the MOSFET M1 to charge the capacitors C3 and C4. As the voltage signal at the voltage input 104 exceeds the CR1 Zener voltage, current flows through the transistor Q3 and through the MOSFET M1 to make output voltage Vcap1 available at the load 108 and capacitors C3 and C4.

When the voltage at the Zener diode CR2 exceeds the CR2 Zener voltage, current flows through the Zener diode CR2 and diode D1 into the source 132 of the switch M1, limiting the gate voltage low to protect the MOSFET M1. Current subsequently may flow through transistors Q2 and/or Q3 to provide the voltage Vcap, e.g., as previously described. The DC voltage-limiting circuit 100 thus may be protected if, e.g., an unusually high voltage signal is received at the voltage input 104 of a mistakenly wired thermostat. In one example embodiment, the Zener diode CR1 has a Zener voltage of 8.2V and the Zener diode CR2 has a Zener voltage of 16V.

When the voltage Vcap1 has reached the upper limit of the DC voltage-limiting circuit 100, e.g., 30 volts, as set by the Zener voltage of the Zener diode CR3, current flows through the Zener diode CR3 and the base 172 of the transistor Q1. Current then flows through the collector 164 and emitter 168 of transistor Q1 to ground GND, until the voltage Vcap1 returns to voltage level(s) less than the Zener voltage of the Zener diode CR3.

Figure 3:
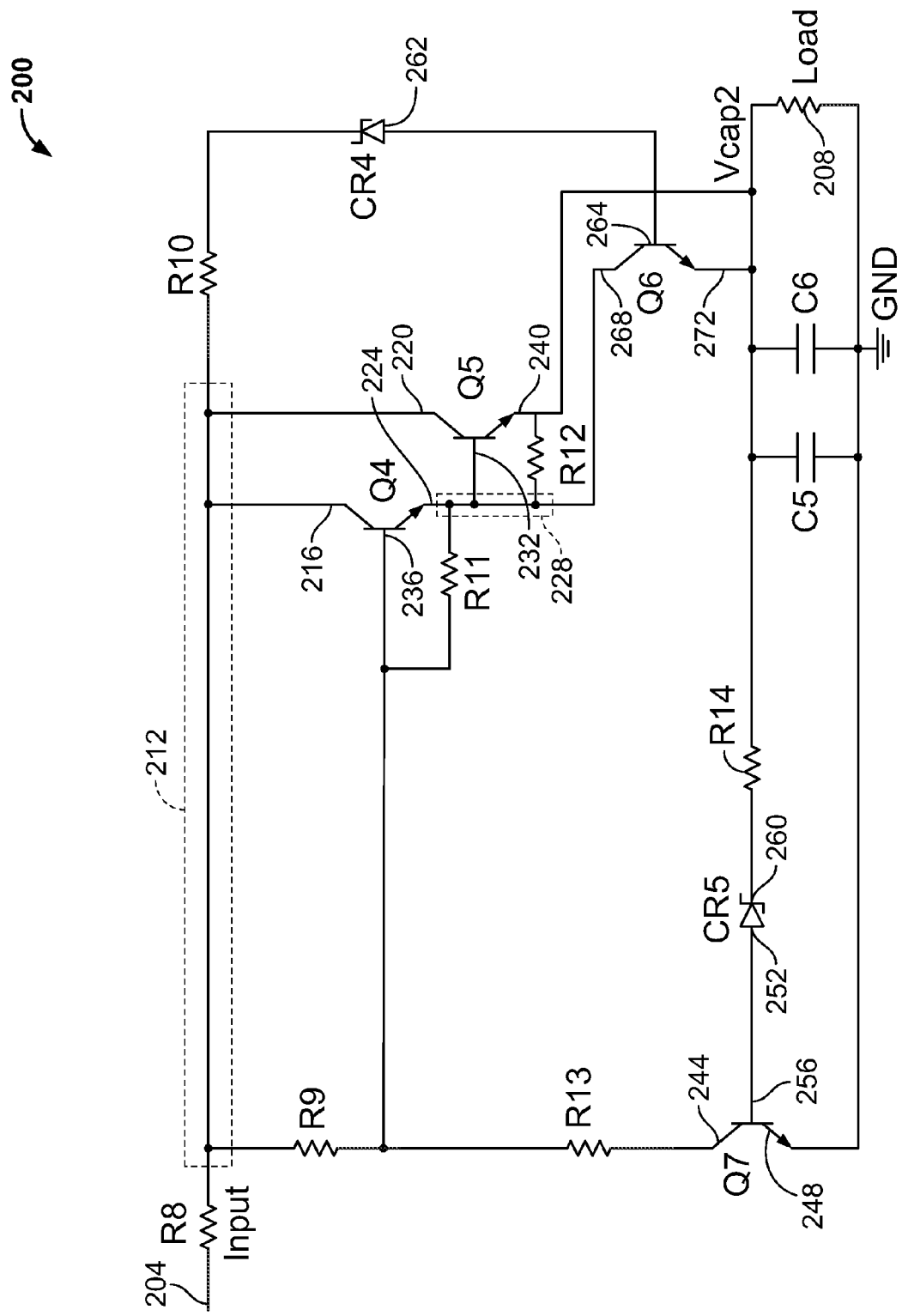
FIG. 3 is a diagram of a DC voltage-limiting circuit in accordance with one example embodiment of the present disclosure.

Example components of the DC voltage-limiting circuit 100 are as follows.
 R1: 12Ω
 R2: 43KΩ
 R3: 0.96KΩ
 R4: 1KΩ
 R5: 3.9KΩ
 R6: 10KΩ
 R7: 20KΩ
 Q1: NSS60201
 Q2: FCX493
 Q3: NSS60201
 CR1: MMSZ4694, Vz=8.2V
 CR2: MMSZ4703, Vz=16V
 CR3: MMSZ4713, Vz=30V
 D1: MBRO540
 M1: DMN10H220
 C3: 820 uf
 C4: 820 uf Another example embodiment of a DC voltage-limiting circuit is indicated generally in FIG. 3 by reference number 200. The DC voltage-limiting circuit 200 receives at a voltage input 204 a voltage input signal, e.g., rectified AC voltage from a rectifier circuit included in power stealing circuitry of a thermostat (not shown in FIG. 3). The DC voltage-limiting circuit 200 provides an output voltage Vcap2, e.g., for powering a thermostat load 208 using two capacitors C5 and C6. The capacitors C5 and C6 are connected in parallel between the output voltage Vcap2 and ground GND. It should be noted that although the two capacitors C5 and C6 are provided in the present example embodiment, in other embodiments a single capacitor or more than two capacitors could be provided.

The voltage Vcap2 varies with the load 208 and with the amounts of charge on the capacitors C5 and C6. In the present embodiment, the DC voltage-limiting circuit 200 limits the voltage Vcap2 to 30 VDC, and the load 208 is a buck circuit (not shown in FIG. 3). It should be noted, however, that various DC voltage-limiting circuit embodiments in accordance with aspects of the disclosure could be used to limit voltage to other voltage values and/or to provide voltage output for use in other or additional types of circuitry.

In the present example embodiment, the voltage input 204 typically is between 24 and 30 volts during thermostat operation. The voltage input 204 could be unusually high, however, e.g., between 48 and 60 VAC, when a user has misconnected a wire on a climate control system 24-volt transformer to the thermostat that includes the DC voltage-limiting circuit 200. In the present example embodiment, the DC voltage-limiting circuit 200 is configured to protect power stealing circuitry and the thermostat in the event that the input voltage reaches a level that otherwise might cause overheating and/or over-voltage conditions.

Referring again to FIG. 3, a small resistance R8 is provided between the voltage input 204 and the rest of the DC voltage-limiting circuit 200. The resistance R8 is connected at a node 212 with a resistor R9, with collectors 216 and 220 of NPN transistors Q4 and Q5, and with a resistor R10 in series with a Zener diode CR4. Several resistors in series could be provided in place of the single resistor R9. Further, it should be noted generally that various components described herein as being included in various embodiments could in some cases be replaced by various functionally equivalent components.

The transistors Q4 and Q5 are configured as a Darlington pair. That is, the transistors Q4 and Q5 are connected in such a way that the current amplified by one of the transistors is further amplified by the other transistor. In various embodiments, a Darlington configuration can provide a higher common/emitter current gain than each transistor taken separately. The emitter 224 of the transistor Q4 is connected at a node 228 with the base 232 of the transistor Q5. A resistor R11 is connected between the base 236 of the transistor Q4 and the node 228. A resistor R12 is connected between the node 228 and the emitter 240 of the transistor Q5. Current leaving the emitter 240 of the transistor Q5 is provided at voltage Vcap2 to the capacitors C5 and C6 and load 208.

The base 236 of the transistor Q4 is connected between the resistor R9 and a resistor R13. The resistor R13 is connected between the base 236 and the collector 244 of an NPN transistor Q7. The emitter 248 of the transistor Q7 is connected to ground GND. The anode 252 of a Zener diode CR5 is connected with the base 256 of the transistor Q7. A resistor R14 is connected between the cathode 260 of the transistor Q7 and the output voltage Vcap2. The anode 262 of the Zener diode CR4 is connected with the base 264 of an NPN transistor Q6. The collector 268 of the transistor Q6 is connected with the node 228. Current leaving the emitter 272 of the transistor Q6 is at the output voltage Vcap2.

In operation, the Darlington transistors Q4 and Q5 supply current to the DC voltage-limiting circuit 200. The transistor Q7 and Zener diode CR5 serve as a switch controller and to limit the level of output voltage Vcap2 to the Zener voltage of the Zener diode CR5, which in the present example embodiment is 30 volts. The Zener diode CR4 and transistor Q6 serve to protect the transistor Q5 from overheating. When the transistor Q5 stops supplying current as described below, the transistor Q4 may continue to supply current to the capacitors C5 and C6 and the load 208.

When a signal at the voltage input 204 has a voltage lower than the Zener voltage of the Zener diode CR4, current flows through the transistors Q4 and Q5 to provide the voltage Vcap2 at the capacitors C5 and C6 and load 208. As the signal voltage at the voltage input 204 exceeds the CR4 Zener voltage, which in the present example embodiment is 9.1 volts, current begins to flow to the base 264 of the transistor Q6 and from the emitter 224 of the transistor Q4 through the collector 268 and emitter 272 of the transistor Q6. The transistor Q4 continues to supply current while current flow through the transistor Q5 is substantially slowed or stopped.

When the voltage Vcap2 has reached the upper limit of the DC voltage-limiting circuit 200, e.g., 30 volts, as set by the Zener voltage of the Zener diode CR5, current flows through the Zener diode CR5 and the base 256 of the transistor Q7. Current then flows through the collector 244 of the transistor Q7 to ground GND.

When the voltage input 204 is unusually high, the circuit 200 converts the high voltage input to current charging into the capacitors C5 and C6, to limit the capacitor output voltage to the desired value. In such manner, a high voltage input can be prevented from directly supplying a subsequent circuit, e.g., the capacitor C1 and/or buck circuit 34 in FIG. 1, thereby providing protection, e.g., against a mistaken wiring situation.

Example components of the DC voltage-limiting circuit 100 are as follows.

R8: 12Ω
R9: 600KΩ
R10: 4.7KΩ
R11: 10KΩ
R12: 10KΩ
R13: 5.1KΩ
R14: 10KΩ
Q4: NSS60201
Q5: FCX493
Q6: NSS60201
Q7: NSS60201
CR4: MMSZ4696, Vz=9.1V
CR5: MMSZ4713, Vz=30V
C5: 820 uf
C6: 820 uf

Embodiments of the foregoing circuits and methods can provide low-cost limitation of DC voltage in various circuits, including but not necessarily limited to power stealing circuits for climate control system thermostats. Various embodiments can be used to provide a considerable power supply at low cost and with low power consumption. If, e.g., an installer does not connect a 24-volt transformer correctly with a thermostat, embodiments of the foregoing circuits can protect the thermostat by avoiding overheating and preventing an over-voltage condition. Various embodiments can make it possible to supply enough current to power loads while at the same time controlling output voltage to desired values. Embodiments in which all components are linear can be inexpensive to produce, which can be particularly advantageous in thermostat, low-power supply and/or battery supply applications. In various embodiments, general DC/DC voltage limiting circuits with considerable current output capability can be provided. Such circuits can provide a wide AC input range at low cost and that consume low levels of power. Embodiments in which a MOSFET is used as a switch can be easily configured at low cost compared, e.g., to DC/DC buck circuits.

Thus, in various embodiments of the present disclosure, a DC voltage limiting circuit includes a current supply portion configured to receive a voltage input signal and provide a voltage output signal; a protective portion configured to limit or halt, at least temporarily, operation of the current supply portion based on a magnitude of the voltage input signal; and a voltage level control portion configured to limit the voltage output signal to a predetermined voltage level; the DC voltage limiting circuit being provided in a climate control system controller.

In some embodiments, the current supply portion includes first and second transistors each having an emitter configured to provide current through a switch to provide the output voltage signal, the second transistor having a base in series with a first Zener diode having a cathode facing away from the base; the first transistor is configured to supply current through the switch when the voltage input signal has a voltage less than the Zener voltage of the first Zener diode; and the second transistor is configured to supply current through the switch when the voltage of the input voltage signal exceeds the Zener voltage of the first Zener diode.

In some embodiments of a DC voltage limiting circuit the protective portion includes a second Zener diode having a Zener voltage higher than the Zener voltage of the first Zener diode, the second Zener diode connected between a gate of the switch and a source of the switch; and the protective portion is configured to control operation of the switch.

In some embodiments of a DC voltage limiting circuit, the voltage level control portion includes a third transistor having a base connected with the voltage output through a third Zener diode having a Zener voltage corresponding to the predetermined voltage level.

In some embodiments of a DC voltage limiting circuit, the first Zener diode has a Zener voltage of 8.2 volts, the second Zener diode has a Zener voltage of 16 volts, and the third Zener diode has a Zener voltage of 30 volts.

In some embodiments, the current supply portion includes first and second transistors in a Darlington configuration configured to receive the voltage input signal and connected with the voltage output.

In some embodiments of a DC voltage limiting circuit, the protective portion includes a first Zener diode connected between the voltage input and a base of a third transistor, and the protective portion is configured to limit the operation of one of the transistors in the Darlington configuration.

In some embodiments of a DC voltage limiting circuit, the voltage level control portion includes a fourth transistor having a base connected with the voltage output through a second Zener diode having a Zener voltage corresponding to the predetermined voltage level.

In some embodiments of a DC voltage limiting circuit, the voltage input signal is provided by a power stealing circuit, and the voltage output signal is for providing power to the controller.

In some embodiments of a DC voltage limiting circuit, the climate control system controller comprises a thermostat.

In various implementations, a method of limiting DC voltage includes: in response to a voltage input signal, supplying current to provide a voltage output signal, the supplying performed by a current supply portion of a DC voltage limiting circuit of a climate control system controller; limiting operation of the current supply portion based on a magnitude of the voltage input signal, the limiting performed by a protective portion of the DC voltage limiting circuit; and limiting the voltage output signal to a predetermined voltage maximum level.

In some implementations, a method includes using the voltage output signal to provide power to the controller.

In various embodiments, a DC voltage limiting circuit includes first and second transistors configured to receive a voltage input signal, each having an emitter configured to provide current through a switch to provide an output voltage signal, the second transistor having a base in series with a first Zener diode reverse-biased in relation to the voltage input signal; a second Zener diode having a Zener voltage higher than the Zener voltage of the first Zener diode, the second Zener diode connected between a gate of the switch and a source of the switch and reverse-biased in relation to the gate; and a third transistor having a base connected with the voltage output through a third Zener diode reverse-biased in relation to the voltage output and having a Zener voltage corresponding to a predetermined voltage level.

In some embodiments of a DC voltage limiting circuit, the first transistor is configured to supply current through the switch when the voltage input signal has a voltage less than the Zener voltage of the first Zener diode; and the second transistor is configured to supply current through the switch when the voltage of the input voltage signal exceeds the Zener voltage of the first Zener diode.

In some embodiments, a DC voltage limiting circuit includes a diode in series with the third Zener diode.

In some embodiments of a DC voltage limiting circuit, the predetermined voltage level is thirty (30) volts.

In various embodiments a climate control system controller includes the DC voltage limiting circuit.

In various embodiments, the DC voltage limiting circuit is comprised by a thermostat.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Or, for example, the term "about" as used herein when modifying a quantity of an ingredient or reactant of the invention or employed refers to variation in the numerical quantity that can happen through typical measuring and handling procedures used, for example, when making concentrates or solutions in the real world through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A DC voltage limiting circuit comprising:
   a current supply portion configured to receive a voltage input signal and provide a voltage output signal;
   a protective portion configured to limit or halt, at least temporarily, operation of the current supply portion based on a magnitude of the voltage input signal; and
   a voltage level control portion configured to limit the voltage output signal to a predetermined voltage level;
   the DC voltage limiting circuit being provided in a climate control system controller;
   wherein the current supply portion comprises:
     first and second transistors each having an emitter configured to provide current through a switch to provide the output voltage signal, the second transistor having a base in series with a first Zener diode having a cathode facing away from the base;
     the first transistor configured to supply current through the switch when the voltage input signal has a voltage less than the Zener voltage of the first Zener diode; and
     the second transistor configured to supply current through the switch when the voltage input signal exceeds the Zener voltage of the first Zener diode;
   wherein the DC voltage limiting circuit further comprises a second Zener diode connected between a gate of the switch and a source of the switch.

2. The DC voltage limiting circuit of claim 1, further comprising a third transistor having a base connected with the voltage output through a third Zener diode, wherein the third transistor and the third Zener diode serve as a switch controller that is configured to control operation of the switch.

3. The DC voltage limiting circuit of claim 1, further comprising a third transistor having a base connected with the voltage output through a third Zener diode having a Zener voltage corresponding to the predetermined voltage level.

4. The DC voltage limiting circuit of claim 3, wherein the first Zener diode has a Zener voltage of 8.2 volts, the second Zener diode has a Zener voltage of 16 volts, and the third Zener diode has a Zener voltage of 30 volts.

5. The DC voltage limiting circuit of claim 1, wherein the voltage input signal is provided by a power stealing circuit, and the voltage output signal is for providing power to the controller.

6. The DC voltage limiting circuit of claim 1, wherein the climate control system controller comprises a thermostat, and/or wherein the predetermined voltage level is thirty (30) volts.

7. The DC voltage limiting circuit of claim 1, wherein:
   the protective portion is configured to limit or halt, at least temporarily, operation of the current supply portion based on a magnitude of the voltage input signal minus capacitor voltage;
   the first transistor is configured to supply current through the switch when the voltage input signal minus capacitor voltage has a voltage less than the Zener voltage of the first Zener diode; and
   the second transistor is configured to supply current through the switch when the voltage input signal minus capacitor voltage exceeds the Zener voltage of the first Zener diode.

8. A DC voltage limiting circuit comprising:
   a current supply portion configured to receive a voltage input signal and provide a voltage output signal;
   a protective portion configured to limit or halt, at least temporarily, operation of the current supply portion based on a magnitude of the voltage input signal; and
   a voltage level control portion configured to limit the voltage output signal to a predetermined voltage level;
   the DC voltage limiting circuit being provided in a climate control system controller;
   wherein the current supply portion comprises first and second transistors in a Darlington configuration configured to receive the voltage input signal and connected with the voltage output; and
   wherein the protective portion comprises a first Zener diode connected between the voltage input and a base of a third transistor, the protective portion configured to limit the operation of one of the transistors in the Darlington configuration.

9. The DC voltage limiting circuit of claim 8, wherein the voltage level control portion comprises a fourth transistor having a base connected with the voltage output through a second Zener diode having a Zener voltage corresponding to the predetermined voltage level.

10. The DC voltage limiting circuit of claim 8, wherein the protective portion is configured to limit or halt, at least temporarily, operation of the current supply portion based on the magnitude of the voltage input signal minus capacitor voltage.

11. A method of limiting DC voltage comprising:
    in response to a voltage input signal, supplying current to provide a voltage output signal, the supplying performed by a current supply portion of a DC voltage limiting circuit of a climate control system controller;
    limiting operation of the current supply portion based on a magnitude of the voltage input signal, the limiting performed by a protective portion of the DC voltage limiting circuit; and
    limiting the voltage output signal to a predetermined voltage maximum level;
    wherein the current supply portion comprises:
      first and second transistors each having an emitter configured to provide current through a switch to provide the output voltage signal, the second transistor having a base in series with a first Zener diode having a cathode facing away from the base;
      the first transistor configured to supply current through the switch when the voltage input signal has a voltage less than the Zener voltage of the first Zener diode; and
      the second transistor configured to supply current through the switch when the voltage input signal exceeds the Zener voltage of the first Zener diode;

wherein the DC voltage limiting circuit further comprises a second Zener diode connected between a gate of the switch and a source of the switch.

12. The method of claim 11, further comprising using the voltage output signal to provide power to the controller.

13. The method of claim 11, wherein:
the method includes limiting operation of the current supply portion based on the magnitude of the voltage input signal minus capacitor voltage;
the first transistor configured to supply current through the switch when the voltage input signal minus capacitor voltage has a voltage less than the Zener voltage of the first Zener diode; and
the second transistor configured to supply current through the switch when the voltage input signal exceeds the Zener voltage of the first Zener diode.

14. A DC voltage limiting circuit comprising:
first and second transistors configured to receive a voltage input signal, each having an emitter configured to provide current through a switch to provide an output voltage signal, the second transistor having a base in series with a first Zener diode reverse-biased in relation to the voltage input signal;
a second Zener diode having a Zener voltage higher than the Zener voltage of the first Zener diode, the second Zener diode connected between a gate of the switch and a source of the switch and reverse-biased in relation to the gate; and
a third transistor having a base connected with the voltage output through a third Zener diode reverse-biased in relation to the voltage output and having a Zener voltage corresponding to a predetermined voltage level.

15. The DC voltage limiting circuit of claim 14, wherein:
the first transistor is configured to supply current through the switch when the voltage input signal has a voltage less than the Zener voltage of the first Zener diode; and
the second transistor is configured to supply current through the switch when voltage input signal exceeds the Zener voltage of the first Zener diode.

16. The DC voltage limiting circuit of claim 14, further comprising a diode in series with the second Zener diode.

17. The DC voltage limiting circuit of claim 14, wherein the predetermined voltage level is thirty (30) volts.

18. A climate control system controller comprising the DC voltage limiting circuit of claim 14.

19. The DC voltage limiting circuit of claim 14, comprised by a thermostat.

20. The DC voltage limiting circuit of claim 14, wherein:
the first transistor is configured to supply current through the switch when the voltage input signal minus capacitor voltage has a voltage less than the Zener voltage of the first Zener diode; and
the second transistor is configured to supply current through the switch when the voltage input signal minus capacitor voltage exceeds the Zener voltage of the first Zener diode.

* * * * *